United States Patent
Akman et al.

(10) Patent No.: US 9,549,333 B2
(45) Date of Patent: Jan. 17, 2017

(54) METHOD AND DEVICE FOR MONITORING AND MEASUREMENT OF WI-FI INTERNET SERVICES

(71) Applicant: TURK TELEKOMUNIKASYON A.S., Ankara (TR)

(72) Inventors: Arda Akman, Ankara (TR); Onur Eker, Ankara (TR); Burcu Yargicoglu, Ankara (TR); Cihan Emre Kement, Ankara (TR); Mustafa Atalar, Ankara (TR)

(73) Assignee: Turk Telekomunikasyon A.S., Ankara (TR)

( * ) Notice: Subject to any disclaimer, the term of this patent is extended or adjusted under 35 U.S.C. 154(b) by 888 days.

(21) Appl. No.: 13/907,343

(22) Filed: May 31, 2013

(65) Prior Publication Data

US 2013/0322262 A1 Dec. 5, 2013

(30) Foreign Application Priority Data

Jun. 1, 2012 (TR) .............. a 2012 06425

(51) Int. Cl.
*H04W 24/10* (2009.01)
*H04J 1/16* (2006.01)
*H04W 24/04* (2009.01)
*H04W 24/08* (2009.01)

(52) U.S. Cl.
CPC ............. *H04W 24/10* (2013.01); *H04W 24/04* (2013.01); *H04W 24/08* (2013.01)

(58) Field of Classification Search
USPC ................... 370/252, 329, 216, 241, 386
See application file for complete search history.

(56) References Cited

U.S. PATENT DOCUMENTS

| | | | |
|---|---|---|---|
| 2006/0068769 A1 | 3/2006 | Adya et al. | |
| 2006/0223495 A1* | 10/2006 | Cassett | H04L 43/026 455/405 |
| 2006/0234639 A1 | 10/2006 | Kushwaha et al. | |
| 2007/0066297 A1 | 3/2007 | Heidari-Bateni | |
| 2007/0081469 A1 | 4/2007 | Tracy et al. | |
| 2007/0110018 A1 | 5/2007 | Delaney et al. | |
| 2007/0259670 A1 | 11/2007 | Sakhpara | |
| 2008/0209537 A1 | 8/2008 | Wong et al. | |
| 2009/0093264 A1* | 4/2009 | Heredia | H04L 12/581 455/466 |
| 2011/0275364 A1* | 11/2011 | Austin | H04L 41/12 455/423 |

FOREIGN PATENT DOCUMENTS

GB 2470360 A 11/2010

* cited by examiner

*Primary Examiner* — John Pezzlo
(74) *Attorney, Agent, or Firm* — Birch, Stewart, Kolasch & Birch, LLP

(57) ABSTRACT

The present invention is related to a method and a device which contains a diagnostic client (5) and a monitoring server (9) which aim to detect connection problems and service failures of Wi-Fi hotspot (wireless access field) services and measure user experience and connection quality.

25 Claims, 6 Drawing Sheets

US 9,549,333 B2

METHOD AND DEVICE FOR MONITORING AND MEASUREMENT OF WI-FI INTERNET SERVICES

TECHNICAL FIELD

The present invention is related to structures which detect connection problems and service failures of Wi-Fi hotspot (wireless access field) and measure user experience and connection quality.

BACKGROUND ART

Various different Wi-Fi (Wireless Fidelity) wireless access structures are used for wireless internet access. Such structures are commonly used for wireless internet/network access purposes particularly at such locations as airports, shopping centers, restaurants/cafes, holiday complexes, fairgrounds, parks, and squares. Wi-Fi wireless access field (hotspot) provides Wi-Fi service provider backbone network channel connection to Wi-Fi devices via a Wi-Fi Hotspot Access Point. Wi-Fi hotspot further provides connection for security purposes or on subscription basis depending upon the choice of some Wi-Fi Hotspot Service Providers. Thereupon, before connecting a device to internet, Wi-Fi hotspot makes the device user pass through security control or payment verification by using Authentication Server of Service Provider. Only if and when it successfully passes through security control or payment control, Wi-Fi device is connected to internet. In general, Wi-Fi hotspot connection process passes through the following steps. Any Wi-Fi device links to a Wi-Fi hotspot access point and gets an IP address for device in order to be connected to Wi-Fi hotspot. Then, device user enters such information as password, and Wi-Fi service provider initiates authentication process. If authentication is completed successfully, user is granted a permission for access to Internet and/or Intranet. User enters the web address intended to be visited. Wi-Fi service provider scans through DNS servers and finds IP address of the web address, and provides the required connection to the relevant website.

Different control structures have been built in order to monitor the operability, connection speed and efficiency of Wi-Fi hotspot. As an example for this type of structures: In the application no. US20080209537 titled "Self-Initiated End-to-End Monitoring of an Authentication Gateway", operability of authentication gateway on network is monitored. In the application, a test process initiated by authentication gateway for this purpose is explained. Authentication gateway identifies a temporary user in the system, and sends this temporary user to a special client in network, and requests the client to try to link to network through this temporary user, and tests its own operability according to the result obtained by the client. Said application has been designed to monitor operability of authentication gateway. Particularly in the case of network and access problems, authentication server cannot transmit this authentication process to the client in network, thereby initiating the authentication process. Furthermore, the innovation described in this application only aims the authentication. It does not aim to measure other services and user experience in hotspots.

Another one is the application no. US20070259670 titled "Mobile Wi-Fi network monitor". Said application describes the structure measuring the bandwidth of Wi-Fi hotspot service. In the application, a connection analysis realized by using a mobile device such as a telephone and an analysis client installed in the device is explained. Analysis client links to network, and determines bandwidth of connection. Analysis client measures bandwidth of connection on date and position bases, and transmits such measurement data to the server where analysis data are stored. However, in the innovation described in the said application, no information other than the position based bandwidth is kept. System does not test operability and performance of all Wi-Fi and Internet services to be used by a Wi-Fi hotspot user in the system. Another application no. GB2470360 titled "Monitoring the reliability of hotspots in packet-based Networks" describes the identification and reporting of inoperable wireless networks, and the establishment of connection according to the order of priority.

Wi-Fi hotspots occasionally face such various technical problems as disconnections and snagging due to various different reasons. When these technical problems occur inside Wi-Fi hotspot access point and Wi-Fi service provider backbone network, Wi-Fi service provider can record the problem in network monitoring system as it continuously provides data flow. However, in the case of a connection problem between Wi-Fi hotspot access point and Wi-Fi device, the backbone central network monitoring systems cannot detect the problems in Wi-Fi wireless networks. Such connection problems can be understood generally upon complaints and warnings of users using Wi-Fi hotspots. For this reason, connection problems faced by Wi-Fi service provider users cannot be detected and remedied in a short time.

Though Wi-Fi service provider central network monitoring solutions providing Wi-Fi wireless access services can monitor backbone network up to DSL or fiber modem, being the last cabled connection point, they fail to collect information about operability and quality of service in wireless access field at Wi-Fi hotspot access point and thereafter. Therefore, problems occurring on the side of Wi-Fi hotspot are recognized first by customers, and Wi-Fi service providers become aware of these problems only upon customer complaints.

The aforementioned existing applications provide the opportunity to monitor by different ways the connection established between Wi-Fi service provider and Wi-Fi hotspot access point. Potential disadvantage of the existing applications is their failure in reliable monitoring of communication between Wi-Fi hotspot access point and Wi-Fi device (user) while controlling the operability of Wi-Fi hotspot services. Another disadvantage thereof is that they require a control and measurement mechanism starting from the user side.

In order to eliminate the said disadvantages, a device and a method are developed to measure operability, quality and performance of wireless network services provided at Wi-Fi hotspots, thereby measuring the user experience, and to instantly detect the service failures, and to create and issue short- and long-term performance reports of the system.

DISCLOSURE OF THE INVENTION

Departing from the state of the art, this invention aims to eliminate the existing disadvantages through improvements in the structures which detect connection problems and service failures, and measure user experience and connection quality in Wi-Fi hotspots.

Another purpose of the invention is to bring some improvements with a view to detecting Wi-Fi hotspot service and connection problems, and improving the service quality in Wi-Fi hotspots, and creating and issuing short- and long-term performance reports. Another purpose of the invention is to create a system composed of a diagnostic client device and a central monitoring server used with the intention of measuring the connection efficiency of hotspot services, and conducting tests, and producing reports thereon.

Another purpose of the invention is to create a device which one-to-one measures the user experience through a diagnostic client installed in Wi-Fi hotspot, and tests the operability of services, and reports historically. Another purpose of the invention is to ensure that even in the case of disconnection of Wi-Fi hotspot access point, diagnostic client immediately reports to Wi-Fi service provider through alternative wireless mobile networks. Thus, Wi-Fi service provider connection problems will be detectable without any complaints or warnings of users. Another purpose of the invention is to ensure that diagnostic client conducts the performance tests and transmits the results thereof to monitoring server even if it fails to connect due to such various failures as authentication. Another purpose of the invention is to ensure that in the case of availability of more than one Wi-Fi hotspot in wide areas, these access points are measured by using a number of diagnostic client devices less than the number of Wi-Fi hotspots. Thus, a diagnostic client device will not be required separately for each Wi-Fi hotspot.

For achievement of the purposes mentioned in the preceding paragraphs, some innovations have been made in detecting the connection problems and service failures in Wi-Fi hotspot services, and in the methods and control devices used for measuring the user experience and connection quality.

As an innovation in a preferred embodiment of the invention, at least one diagnostic client is created in order to identify oneself to Wi-Fi hotspot by following the required steps thereinfor, as if it was a customer, and to test operability and wireless network quality of the mentioned Wi-Fi hotspot, and to test and report operability and performance of Internet access services provided through Wi-Fi hotspot, and to send the produced report to monitoring server. Thus, performance test of Wi-Fi hotspots is conducted also on the user side. By doing so, various details which cannot be detected in performance tests conducted between Wi-Fi hotspots and Wi-Fi service provider have been made measurable. Hence, the problems faced between Wi-Fi hotspot and user have become measurable.

As an innovation in a preferred embodiment of the invention, at least one monitoring server is created in order to record and display the operability and performance reports of diagnostic clients, and to produce the required warnings. Thus, central control of general situation of Wi-Fi hotspots is made possible. Hence, Wi-Fi service provider is enabled to monitor the relevant alarms or statistics more easily, and to quickly make the required professional maintenance and repair operations.

As an innovation in a preferred embodiment of the invention, where diagnostic client cannot establish a connection with monitoring server by using Wi-Fi hotspot, on optional mobile connection is created so as to enable diagnostic client to transmit service report and connection problem to monitoring server. By doing so, the existing problems can be detected and quickly resolved by service provider without any warning or complaint of Wi-Fi hotspot users. Thus, any connection problems in Wi-Fi hotspot can be transmitted. Hence, a disconnection problem is reported first to Wi-Fi service provider, thereby making a professional intervention to the system possible upon occurrence of a disconnection problem.

In a preferred embodiment of the invention, the method of detecting connection problems and service failures and of measuring user experience and connection quality in hotspot services is structured by combination of the following basic steps:

the mentioned diagnostic client establishes a connection with the hotspot chosen according to criteria determined by service provider;

the mentioned diagnostic client, by using the user profiles supported by service provider and acting as a real user, automatically presents its identity information to service provider and enters the system;

the mentioned diagnostic client conducts service operability tests in line with the criteria determined by service provider;

the mentioned diagnostic client conducts performance tests in line with the criteria determined by service provider;

the mentioned diagnostic client creates a report registry with respect to its tests and controls; and the mentioned diagnostic clients sends its reports to monitoring server.

By doing so, through a diagnostic client installed in Wi-Fi hotspots, by following all steps required to be followed by a real customer to link to Wi-Fi hotspot and use the services provided therein, it is made possible to one-to-one measure the customer experience, and to test the operability of services, and to report historically. As a result, a solution enabling Wi-Fi service providers to monitor and follow the service operability of Wi-Fi hotspots and to enhance the service quality, as well as an embedded device, being a part of the said solution, are obtained.

The invention is described below in more details through a description of example model shown in the attached diagrams in a simplified manner.

DETAILED DESCRIPTION OF THE INVENTION

Figure 1:
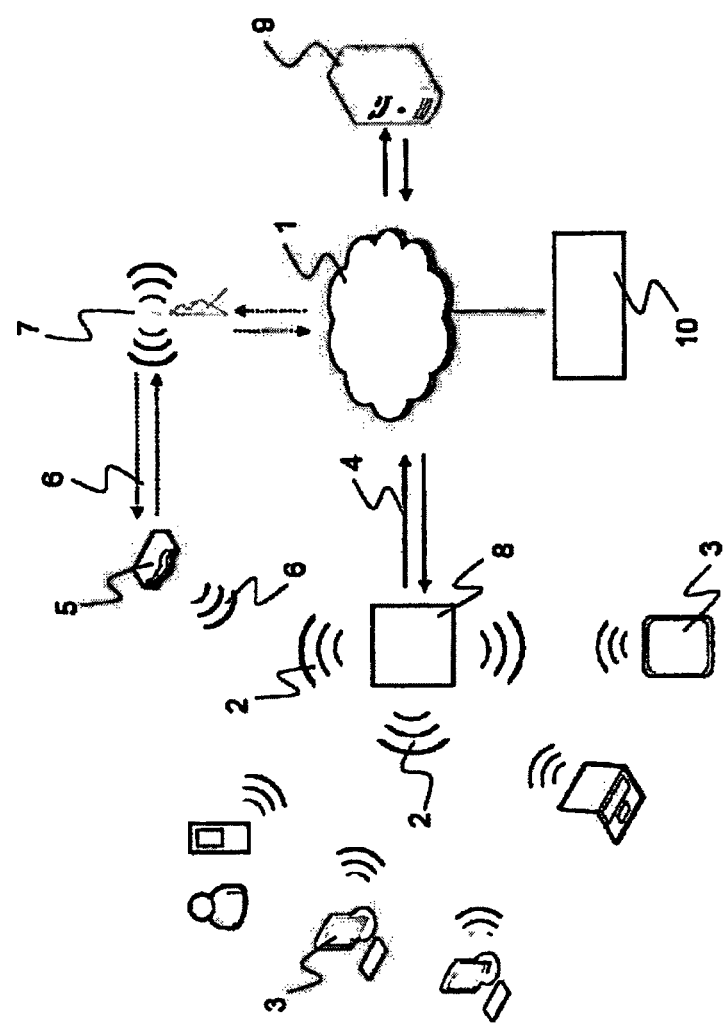
FIG. 1: Appearance of an operation diagram where hotspot is measured by a diagnostic client in a representative application of the invention.

The application of the invention described in the figures is related to a method and a device aiming to detect connection problems and service failures in Wi-Fi hotspots (2), and to measure and control the user experience and connection quality. The innovation comprises two main equipments and a new operating method. FIG. 1 describes diagnostic clients (5) to be installed on Wi-Fi hotspots (2) and of monitoring server (9) to be installed in network monitoring center of Wi-Fi service provider, as shown in FIG. 1.

Figure 3:
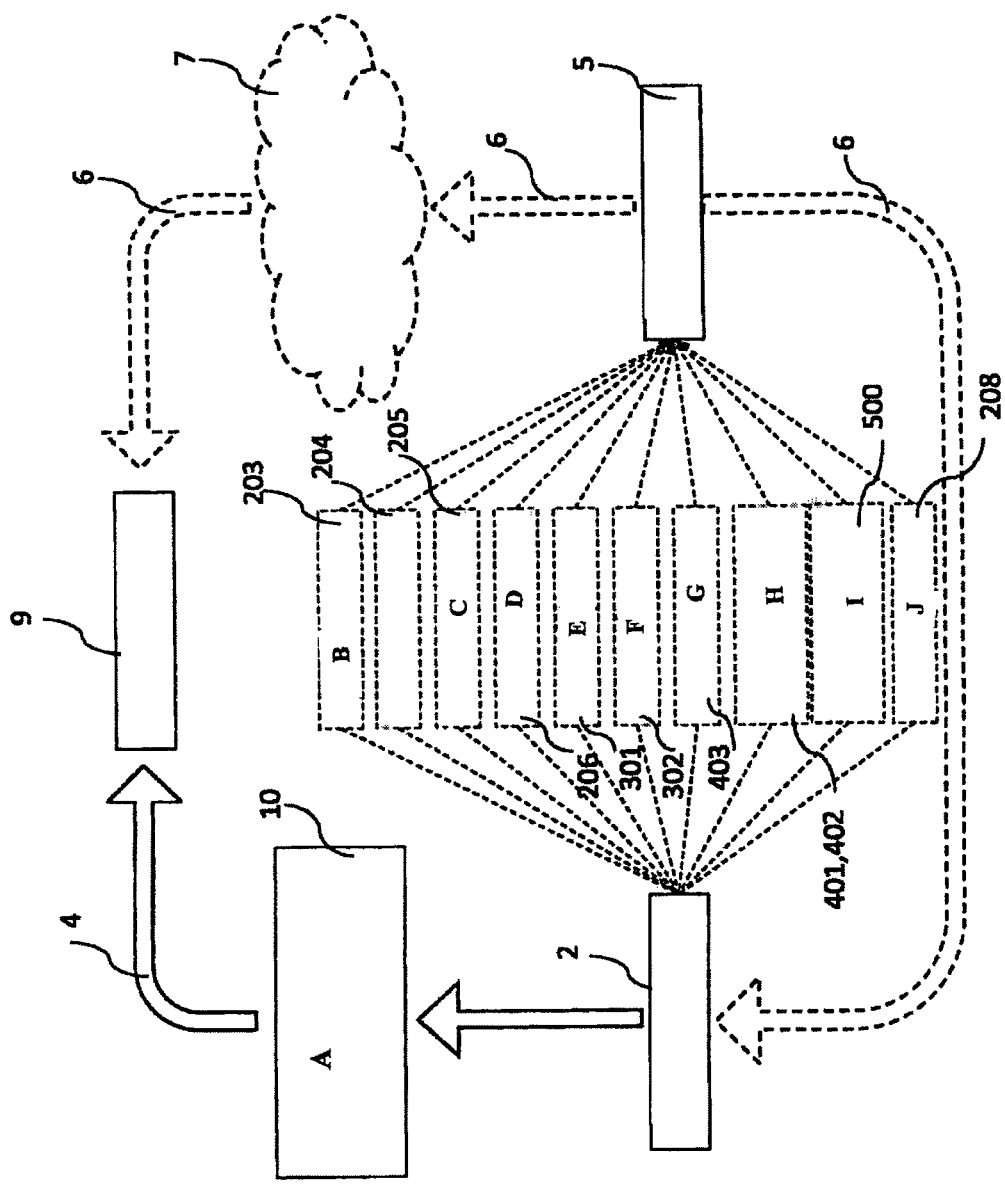
FIG. 3: Schematic appearance showing the modus operandi between hotspot and diagnostic client in a representative application of the invention.
Figure 4:
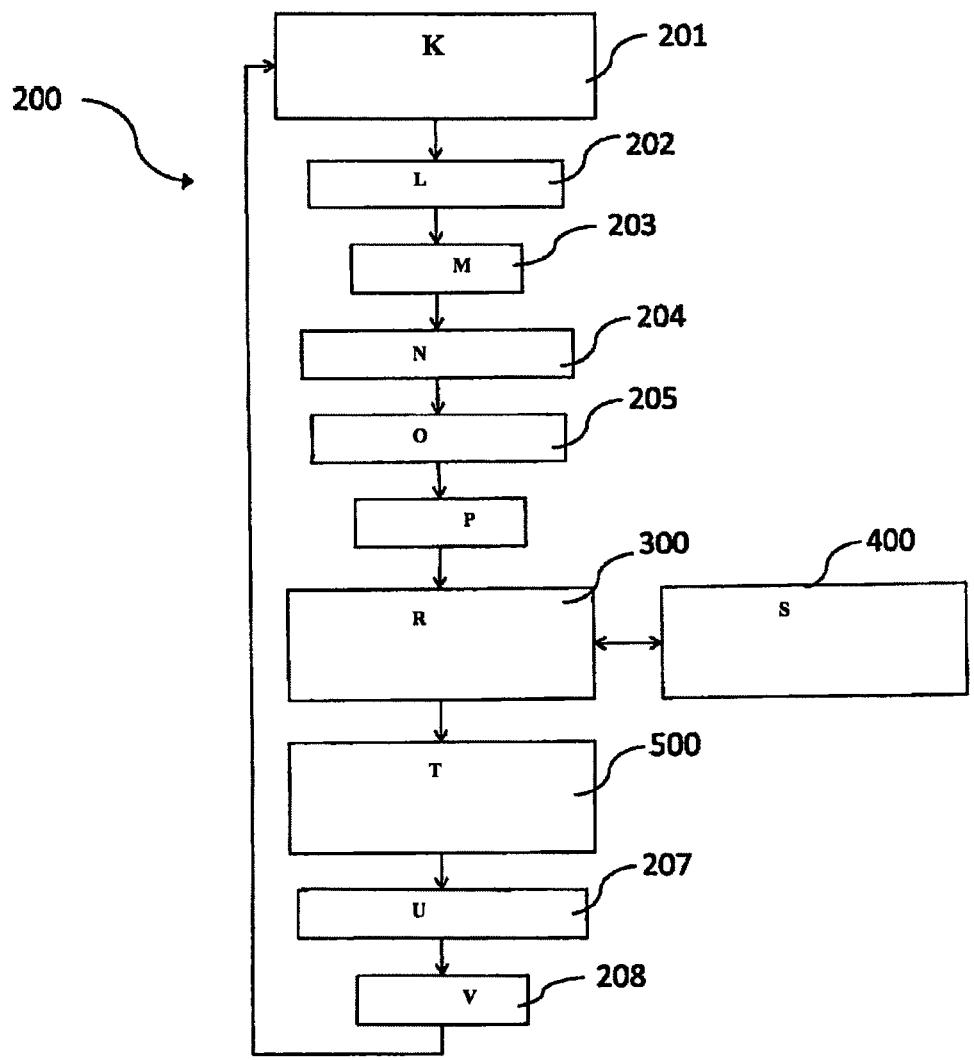
FIG. 4: Flow diagram of operations in an exemplary operation between hotspot and diagnostic client in a representative application of the invention.

FIG. 3 and FIG. 4 describe the operation steps of measurement and monitoring of service operability and performance of hotspot (2). The operation steps are as detailed below: Wi-Fi service provider optionally prepares a diagnostic client (5) for measurement by making initial pre-measurement settings with respect to the to-be-measured hotspot (2) (201). Diagnostic client (5) also performs measurement tests by a method termed as plug-and-play without any settings as mentioned above. Diagnostic client (5) scans the Wi-Fi hotspots (2) in its environment (202). Diagnostic client (5) arranges in order the Wi-Fi hotspots (2) according to criteria predetermined by service provider. Diagnostic client (5) selects one of the hotspots (2), if more than one, in line with criteria determined by service provider. In locations with more than one hotspot (2), diagnostic client first preferably selects the hotspot (2) with the strongest wireless network signal. Diagnostic client (5) establishes a wireless network connection with hotspot (2) (203), and keeps the wireless network signal strength of wireless access point (8) as a performance data, and presents the same to monitoring server (9) within the post-testing reports. At the background, hotspot (2) assigns an IP address to diagnostic client (5) by using DHCP (204). In the meantime, diagnostic client (5) keeps the DHCP IP address assignment process time as a performance data, and presents the same to monitoring server (9) within the post-testing reports. Diagnostic client (5), acting as a user, wishes to enter any web address on Internet network. Hotspot (2) establishes a DNS server connection via Internet and/or Intranet (1), and performs IP address analysis of the relevant web address (205). Then, it establishes a HTTPS connection to input monitor (206). Wi-Fi service provider carries out an authentication just like it is done for a real user (Wi-Fi device (3)). Authentication is conducted by the authentication method determined by Wi-Fi service provider. Authentication is required for access to IP obtained within the Internet network access policy. Authentication is performed through authentication server (10). Authentication server (10) of Wi-Fi service provider requests from diagnostic client (5) such various registered identity data as user name, password, credit card information and temporary customer number, just as it is done for a real user (login) (300). Diagnostic client (5), just like a user, sends the identity data to authentication server (10). Following authentication by authentication server (10), access of diagnostic client (5) to Internet is established. Diagnostic client (5) keeps records of whether all steps described above are successfully completed or not, as well as the process periods. Diagnostic client (5) records as performance data the realization of authentication, as well as the process periods. If all steps are completed successfully, hotspot (2) shows the relevant web page following completion of authentication step. After the authentication, diagnostic client (5) first measures speed/performance during connection (400). In order to determine the performance of hotspot (2) and network backbone services, it carries out DNS analysis time (401) and packet-loss tests (402). Later, in order to determine Internet and/or Intranet (1) bandwidth performance of hotspot (2), it conducts data upload/download test (403). Thereafter, it creates a report (log) with respect to its tests and controls, and then, sends the resulting reports to monitoring server (9) (500). Finally, after completion of test process, it leaves hotspot (2) (208). Following completion of all process steps described above, diagnostic client (5) may alter or delete all relevant information (physical address (MAC), IP address, etc.) through which Wi-Fi wireless access point (8) may remember diagnostic client (5).

Figure 2:
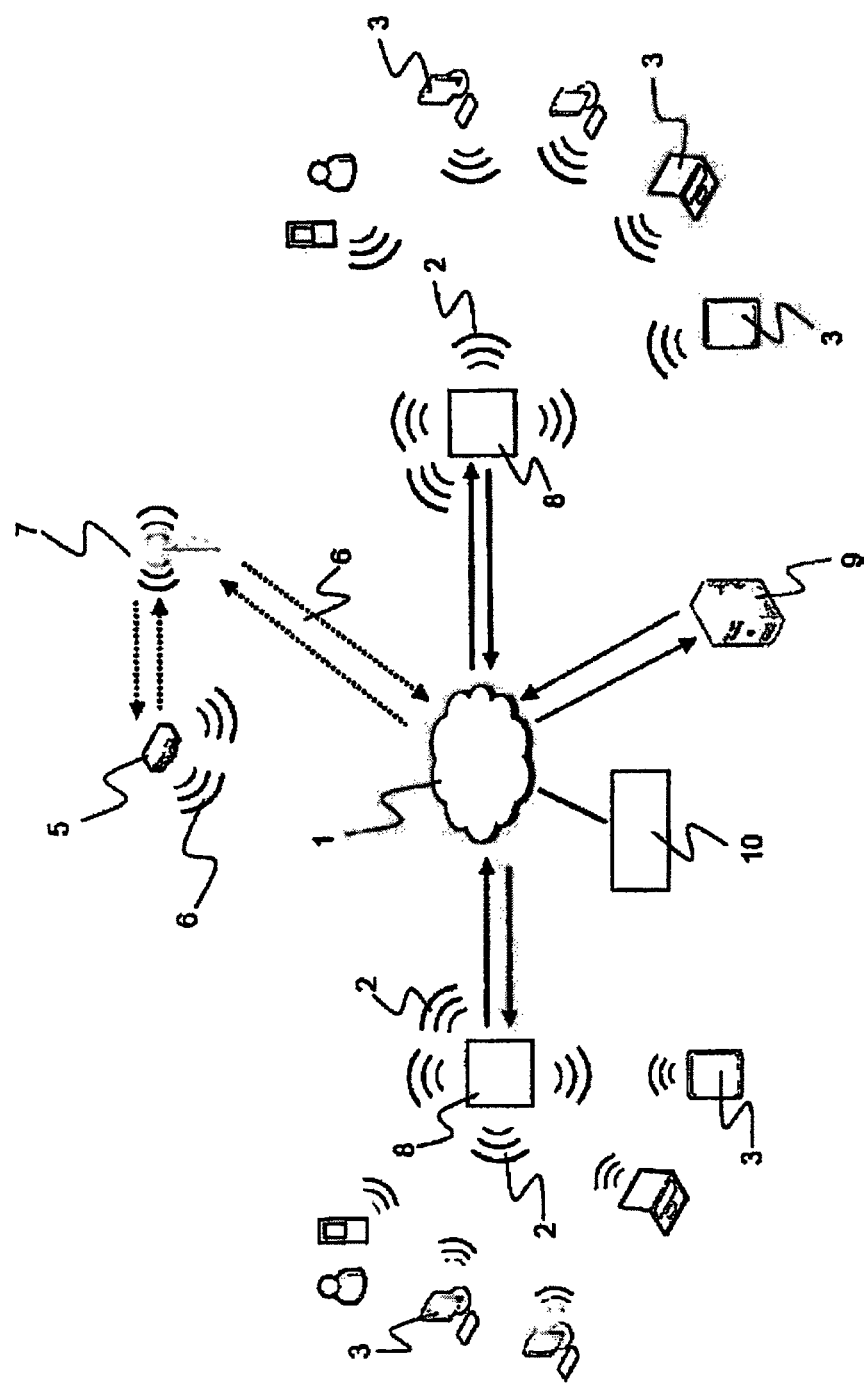
FIG. 2: Appearance of an operation diagram where more than one hotspot are measured by a diagnostic client in a representative application of the invention.

As shown in FIG. 1 and FIG. 2, a diagnostic client (5) is periodically linked to hotspot (2) by taking the required steps as if it was a customer, and enters the system by using user name/password (login), and tests the operability and performance of hotspot (2) services, and leaves the system (logout), and produces reports about all these services, and transmits the reports to monitoring server (9). The characteristic attribute of diagnostic client (5) and central monitoring server (9) is that they provide a solution which uses and tests, just like a customer, both the operability and quality of all services between hotspot (2) and Wi-Fi devices (3), and all other backbone network services (authentication system, link to Internet through backbone network, Internet speed, etc.) which may affect the hotspot (2) services, and thus, can report the whole Wi-Fi network situation of a service provider operator.

Diagnostic client (5) is a solution following the operability of services of hotspot Wi-Fi service provider, thereby ensuring the enhancement of service quality, and an embedded device being a part of this solution. Diagnostic client (5) tests Wi-Fi wireless access fields (hotspots) (2) just like a customer, thereby realizing the customer experience, and identifies itself to hotspot (2) by following the required steps, as if it was a customer, and collects general performance data about hotspot (2) services, and tests the operability of hotspot (2) services, and produces operability and performance reports about hotspot (2) services, and sends the resulting report to monitoring server (9).

Monitoring server (9) centrally receives, records and displays the operability and performance reports of diagnostic clients (5), and produces the required warnings, and reports them to Wi-Fi service provider. It enables Wi-Fi service provider to create statistics and produce the required warnings. Monitoring server (9) is a server which enables Wi-Fi service provider to see the whole hotspot (2) network on real time basis, and to follow the service operability and service quality, and to produce the required alarms upon occurrence of predefined problems. Optional mobile connection (7) is a link which provides an alternative connection if and when diagnostic client (5) fails to transmit its reports to monitoring server (9) through wireless access point (8). This mobile connection (7) assures accessibility to monitoring server (9) if and when diagnostic client (5) fails to link to monitoring server (9) via Internet and/or Intranet (1) connection through wireless access point (8). Thus, diagnostic client (5) will have the chance to transmit its service operability and performance reports to monitoring server (9) via an alternative connection.

Figure 8:
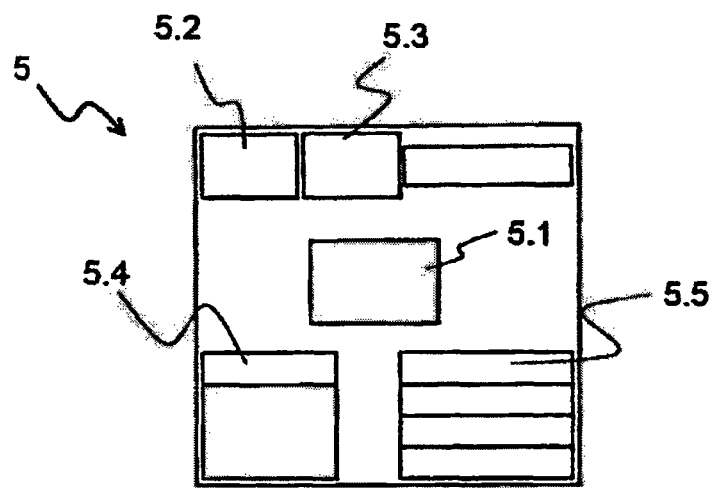
FIG. 8: Block diagram of diagnostic client in a representative application of the invention.

FIG. 8 is a block diagram of basic hardware elements of diagnostic client (5). Diagnostic processor (5.1) is the basic hardware ensuring the operation of operating system, applications and scripts of diagnostic client (5). Wi-Fi module (5.2) enables diagnostic client (5) to establish a data connection (6) (diagnostic data connection) with wireless access point (8). Mobile module (5.3) (diagnostic optional mobile network module) is an equipment which enables diagnostic client (5) to establish connection with monitoring server (9) through alternative mobile connection (7) if and when it fails to connect to monitoring server (9) via hotspot (2). This module is an optional hardware element. Diagnostic memory (5.4) (diagnostic data memory) is a hardware element with retained data storage attribute, which records the measurement results of diagnostic client (5). Diagnostic program memory (5.5) is the part hosting the scripts, applications and operating system of diagnostic client (5).

Figure 9:
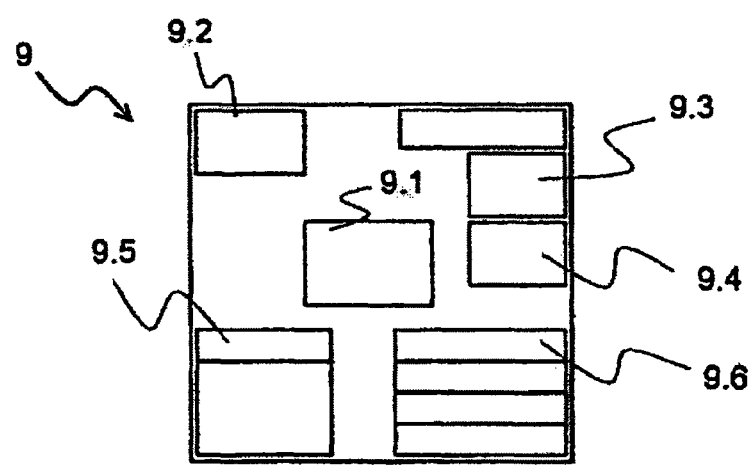
FIG. 9: Block diagram of monitoring server in a representative application of the invention.

FIG. 9 is a block diagram of basic hardware elements of monitoring server (9). Monitoring processor (9.1) is the basic hardware ensuring the operation of operating system, applications and scripts of monitoring server (9). Monitoring network connection module (9.2) establishes a connection via Internet and/or Intranet (1) between monitoring server (9) and diagnostic client (5). Monitoring display (9.3) ensures that the reports collected by monitoring server (9) from diagnostic clients (5) are properly displayed, controlled and managed. Monitoring display (9.3) is a displaying device facilitating the operational monitoring of network by service provider. User interface (9.4) is a software ensuring that monitoring server (9) is controlled and managed by service provider. Monitoring memory (9.5) (monitoring data memory) is a hardware element with retained data storage attribute, where monitoring server (9) records the measurement results (reports) received from diagnostic client (5). Monitoring program memory (9.6) is the part hosting the scripts, applications and operating system of monitoring server (9).

Hardware attributes of diagnostic client (5) ensure automatic operation in practice. Diagnostic client (5) has a program that can automatically connect to hotspot (2), and does not require a special installation by Wi-Fi service provider to hotspot (2), and contains a plug-and-play attribute. Diagnostic client (5) can have a real customer user information as defined by Wi-Fi service provider in order to link to hotspot (2), and can itself identify the automatic or temporary users by a special method determined by Wi-Fi service provider. Thus, user identification that is manually done by Wi-Fi service provider can be automatized.

Diagnostic client (5) can have certain specific information about hotspot (2) and/or Wi-Fi service provider network (SSID, Wi-Fi wireless network security method (unsecured, WPA, etc.) etc.). Hence, the plug-and-play attribute can be supported without requiring Wi-Fi service provider to manually identify diagnostic client (5) in monitoring server (9).

Diagnostic client (5) may test the hotspot (2) service operability and performance acting in the customer profiles supported by Wi-Fi service provider. There are different user types supported by Wi-Fi service provider at authentication stage. User types may be Wi-Fi service provider customer, temporary customer, credit card customer, etc. Thus, a secure system is created, providing that diagnostic client (5), if and when needed, automatically identifies a user/password and deletes such information after completion of tests. Furthermore, users and passwords may also be determined statically by service provider, and may be sent to diagnostic client (5) through backbone network for use in tests.

For the sake of access to Internet and/or Intranet (1) through Wi-Fi service provider, diagnostic client (5) may log in hotspot (2) acting as if it was a customer by using various different authentication methods determined by Wi-Fi service provider. Wi-Fi service providers may use different authentication methods for linking the users to Internet and/or Intranet via hotspot (2). Methods such as "Captive Portal", WSDL, and 802.1x are some of them. "Captive Portal" is a method which directs the users first to the authentication web page created by Wi-Fi service provider, and enables the users to log in via this page by using credit card information or such information as user name and password assigned by Wi-Fi service provider. WSDL (Web Service Definition Language) is a method wherein authentication is conducted via HTTP port through an XML format file transfer, and which enables mobile devices to automatically connect to wireless access points.

Authentication (300), Performance (400), Record Transmission (500) and Control scripts make the system modular and provide great convenience for testing of different utilization scenarios by different Wi-Fi service providers. Diagnostic client (5) may optionally test Wi-Fi service provider authentication server (10) and operability and performance of Internet and/or Intranet connection also by using all probable user profiles supported by service provider or through different authentication methods supported by service provider.

FIG. 3 shows the general operational steps of the method of detecting connection problems and service failures and measuring the user experience and connection quality in hotspot services. The operational steps may be listed as diagnostic client's (5) establishing a connection with hotspot (2) identified in accordance with criteria determined by service provider (203), and diagnostic client's (5) automatically logging in the system by providing service provider with its identity information acting like a real user and by using user profiles supported by service provider (300), and diagnostic client's (5) conducting service operability tests in accordance with criteria determined by service provider, and diagnostic client's (5) conducting performance tests in accordance with criteria determined by service provider, and diagnostic client's (5) keeping records and issuing reports with respect to its tests and controls, and diagnostic client's (5) sending its reports to monitoring server (9) (500).

Diagnostic client (5) shown in FIG. 2 separately applies hotspot (2) service operability and performance tests (200) on hotspots (2) accessible with an adequate Wi-Fi signal quality, at locations where several hotspots (2) are available, by using the criteria determined by Wi-Fi service provider. Thus, a diagnostic client (5) is not required separately for each hotspot (2). This in turn provides ease of installation and central control at locations with more than one hotspot (2) such as airports, shopping centers, restaurants/cafes, holiday complexes, fairgrounds, parks and squares.

In the case of availability of more than one hotspot (2) of the same Wi-Fi service provider in a location, diagnostic client (5) optionally records the real-time status information (signal quality, BSSID, etcb) of Wi-Fi wireless access points (8) in diagnostic memory (5.4) (diagnostic data memory), and establishes a link with the hotspot (2) with the strongest signal quality (203). In a different application, at locations with more than one hotspot (2), diagnostic client (5) can apply hotspot (2) service operability and performance tests (200) on hotspots (2) accessible with an adequate Wi-Fi signal quality, starting from the hotspot (2) with the strongest signal strength and going to the weakest hotspot (2). Thus, cost has been reduced, and system installation and maintenance operations have been simplified.

Diagnostic client (5) continuously tests and reports the hotspot (2) by repeating the test and measurement operations (200) with periodical intervals determined by Wi-Fi service provider. Diagnostic client (5) measures and historically reports Wi-Fi and general network operability and performance (DNS response time, internet speed test, etc.) that may be faced by a customer. Diagnostic client (5) may further produce alarm reports for inoperable services or inadequate performance levels depending on test and measurement results, and may direct the same to monitoring server (9) for repair of technical failures. Technical failures may occur in hotspot (2) or backbone network connection (4) or Internet and/or Intranet (1).

Following completion of test process, diagnostic client (5) asks monitoring server (9) which tests are required to be operated in the next test process (207). It takes the applicable test steps from monitoring server (9), and operates the to-be-applied test (200). In order to enable diagnostic client (5) to send the measurement report (log) to monitoring server (9) if and when diagnostic client fails to link to monitoring server (9) through hotspot (2), there is in place an alternative mobile connection (7) used for access of diagnostic client (5) to monitoring server (9) through optional diagnostic client mobile module (5.3).

Diagnostic client (5), if and when an authentication verification cannot be received from Wi-Fi service provider authentication server (10), can conduct tests measuring operability and performance of services which do not require an authentication. Thus, a lot of measurement and test operations applicable in spite of problems at authentication stage can be carried out.

Also if and when an authentication verification cannot be received from Wi-Fi service provider authentication server (10) (authentication service), diagnostic client (5) can send its measurement and performance report to monitoring server (9). This attribute is created by adjusting Wi-Fi service provider monitoring server (9) so as to ensure that IP address is within a network field (open garden) accessible by diagnostic client (5) without any need for user login information and authentication process. By doing so, test operations can be reported in spite of probable problems at authentication stage.

Figure 5:
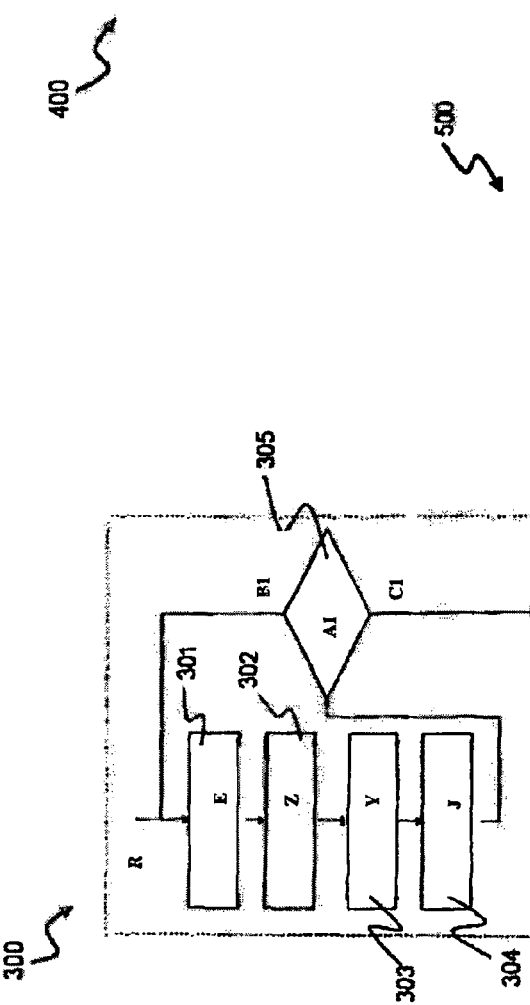
FIG. 5: Flow diagram of operations of authentication scripts in a representative flow diagram given in FIG. 4 in a representative application of the invention.

Diagnostic client (5) shown in FIG. 5 can conduct tests (300) measuring service operability and performance of the mentioned hotspot (2) by using the information of other user profiles, if any, supported by Wi-Fi service provider.

FIG. 5 indicates the operational steps of verification of operability of services provided by hotspot (2). Operational steps are comprised of diagnostic client's (5):
establishing a hotspot (2) link, and performing an authentication for identification through Wi-Fi service provider authentication server (10) accessed via hotspot (2) (Wi-Fi wireless access field), and entering the user information (301), and conducting Internet and/or Intranet connection test (302), and calling performance scripts (303), and logging out via authentication server (10) (304), and completing the authentication operational steps if there is no other user type (305), and repeating the mentioned tests for other user profiles, if any, supported by service provider (5). If there are other user profiles supported by Wi-Fi service provider, diagnostic client (5) makes a re-entry with such other user information. Diagnostic client (5) logs in for authentication and identification through Wi-Fi service provider authentication server (10) accessed via hotspot (2), and repeats the authentication steps (301, 302, 303, 304 and 305).

FIGS. 4, 5, 6, 7 show the operational steps describing the method of hotspot (2) performance measurement (400) by diagnostic client (5). The operational steps may be listed as diagnostic client's (5) measuring the signal strength of Wi-Fi wireless access points (8) within its coverage area, and diagnostic client's (5) testing the speed of taking a DHCP IP address from Wi-Fi wireless access point (8) it is linked (204), and diagnostic client's (5) conducting an access speed test to information login web page, if any, depending on the authentication method supported by service provider, and diagnostic client's (5) testing the speed of connection to authentication server (10), and diagnostic client's (5) testing the speed of authentication of its identity, and diagnostic client's (5) testing the DNS analysis speed (401), and diagnostic client's (5) testing the packet loss (402), and diagnostic client's (5) conducting an access speed test to a web page determined by service provider on Internet and/or Intranet (1), and diagnostic client's (5) testing Internet and/or Intranet (1) bandwidth through data uploading/downloading (403), and diagnostic client's (5) testing the speed of logout through authentication server (10).

Figure 7:
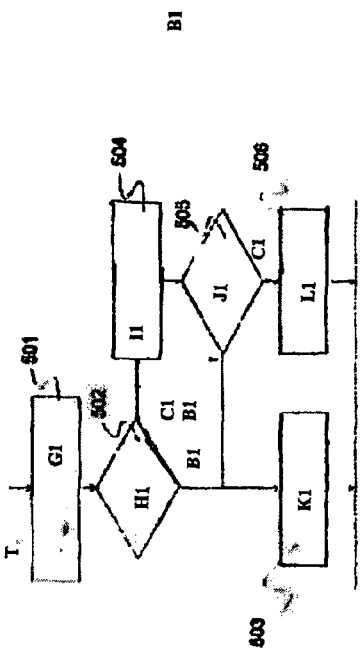
FIG. 7: Flow diagram of operations of record transmission scripts in a representative flow diagram given in FIG. 4 in a representative application of the invention.

FIG. 7 shows the operational steps describing the method of reporting by diagnostic client (5) to monitoring server (9) (500). Monitoring server (9) may be within open garden network accessible without any authentication, and thus, diagnostic client (5) may send its report to monitoring server (9) also in case of non-operation of authentication service. The operational steps may be listed as diagnostic client's (5) linking to monitoring server (9) through hotspot (2) in order to transmit its report, and diagnostic client's (5) conducting a data access test on monitoring server (9) (501), and if the result of control of access to monitoring server (9) (502) is positive, diagnostic client's sending the records to monitoring server (9) (503), or if the result of control of access to monitoring server (9) (502) is negative, diagnostic client's trying to establish a data connection to monitoring server (9) through mobile connection (7) (504), and if the result of control of access to monitoring server (9) through mobile connection (7) (505) is positive, diagnostic client's sending the records (503), or if the result of control of access to monitoring server (9) through mobile connection (7) (505) is negative, diagnostic client's storing the records in retained data diagnostic memory (5.4) (506). The reports which diagnostic client (5) fails to transmit to monitoring server (9) and therefore stores in data memory (5.4) will be transmitted by diagnostic client and deleted from data memory when connection is re-established with monitoring server (9) for data transfer. If and when connection is re-established as a result of an advanced test process, diagnostic client (5) transmits to monitoring server (9) all of the reports which diagnostic client has so far failed to transmit to monitoring server (9) and has therefore stored in diagnostic data memory (5.4).

Diagnostic client (5) shown in FIG. 1 uses a mobile connection (7) in case of its failure in connecting via hotspot (2). Mobile connection (7) is one of 2G, 3G and 4G/LTE, and the developing post-4G mobile connection models installed via mobile network operators.

Diagnostic client (5) has the feature to operate different scripts/commands which enables diagnostic client to test the services of different Wi-Fi service providers without making any change in main client program. Scripts may be for authentication, performance, record transmission and control purposes.

Diagnostic client (5), after successfully transmitting the test and performance reports to monitoring server (9), deletes all reports.

For the sake of performance measurement of hotspot (2), diagnostic client (5) follows and monitors successful/non-successful user demands filed to hotspot (2) by Wi-Fi devices (3) and reports the results to monitoring server (9).

Diagnostic client (5) records all broadcast demands directed to hotspot (2). For instance, DHCP beacons, being the first connection demand of users trying to log in, are recorded. Thus, connection demands of all authorized and non-authorized Wi-Fi devices (3) which have tried to link to network of service provider are collected, and mala fide network attacks are detected earlier, and attacks against data security and system are followed up. By doing so, the number of DHCP beacons available in the system and the hotspot (2) performance data are presented to service provider, and if there is any correlation between them, the cause of performance problem of hotspot (2) is determined and analyzed.

Diagnostic client (5) may experience the use of hotspot (2) by different Wi-Fi devices (3), and may operate independent test processes, and in each new test process, may identify itself to Wi-Fi wireless access point (8) differently from the device of the previous test process. Diagnostic client (5) may, after each test process, ensure that Wi-Fi wireless access point (8) changes all information created for diagnostic client (5) in the previous test process, and all information which may be reused in the next test process.

Diagnostic client may change its physical address information and behave as if it is a different Wi-Fi device (3) in each measurement, control and test process. This in turn makes the test processes separate and independent from each other. Diagnostic client (5) may, at the end of each test process, delete the device-specific information assigned by Wi-Fi wireless access point (8) to diagnostic client (5), and change its physical address information (e.g. MAC address), and behave as if it is a different Wi-Fi device (3), in line with the testing policy determined by service provider. Thus, not only the independence of test processes from each other is ensured, but also test quality is enhanced by detecting the use of hotspot (2) not only by one single device, but by many different devices from the point of view of Wi-Fi service provider. Hence, as the use of a different physical address (MAC) at each time will ensure that DHCP server assigns different IP addresses, it is also made possible to better test the services such as DHCP of Wi-Fi service provider.

Basic scope described in the claims will be taken into consideration, without being limited by aforementioned representative applications of this invention. Alternative structures that may be realized by experts of this technical field on the basis of the basic elements of the claims under protection will be considered and treated as a breach of this invention.

Meanings of the Writings in the Figures

Figure 6:
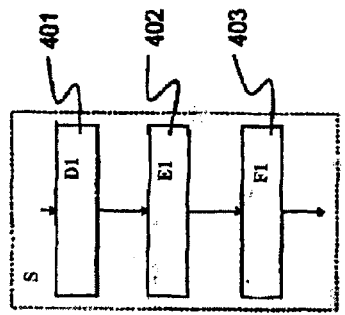
FIG. 6: Flow diagram of operations of performance scripts in a representative flow diagram given in FIG. 4 in a representative application of the invention.

FIG. 3
2=Hotspot
5=Diagnostic Client
7=Mobile Network Connection (2G, 3", 4G/LTE, etc.)
9=Monitoring Server
204=DHCP
A=Packet Core Network (Internet/Intranet)
B=WiFi Connection
C=DNS Analysis
D=HTTPS Demand
E=Logging in
F=Internet Connection
G=Internet Speed
H=DHS & Packet Loss Performance
I=Open Garden Connection
J=Logging out
FIG. 4
K=Adjustment of initial configurations of Diagnostic Client
L=Collection of data about wireless providers in environment
M=Connection to access point of Hotspot
N=Taking a DHCP IP address from and measurement of DHCP performance in Hotspot
O=Analysis of DNS address of input monitor
P=HTTPS connection to input monitor
R=Authentication Scripts
S=Performance Scripts
T=Record Transmission Scripts
U=Taking next test steps from server (optional)
V=Departure from Hotspot network
FIG. 5
Y=Calling of performance scripts
Z=Internet connection test
A1=Is there any other user type?
B1=YES
C1=NO
FIG. 6
D1=Testing of DNS Speed
E1=Testing of Packet Loss
F1=Testing of Internet Speed
FIG. 7
G1=Test the open garden access via Wi-Fi
H1=Is open garden reached?
I1=Shift to mobile connection
J1=Is open garden reached?
K1=Send
L1=Store

REFERENCE NUMBERS

1 Internet and/or Intranet
2 Hotspot
3 Wi-Fi device
4 Backbone network connection
5 Diagnostic client
5.1 Diagnostic processor
5.2 Wi-Fi module
5.3 Mobile module
5.4 Diagnostic memory
5.5 Program memory
6 Data connection
7 Mobile connection
8 Wireless access point
9 Monitoring server
9.1 Monitoring processor
9.2 Network connection module
9.3 Monitoring display
9.4 User interface
9.5 Monitoring memory
9.6 Monitoring program memory
10 Authentication server

The invention claimed is:

1. A device for detecting connection problems and service failures and measuring and controlling user experience and connection quality in hotspot services, comprising:
at least one diagnostic client which identifies itself to a hotspot by taking required steps acting as if it is a customer and is configured to experience the use of hotspot by different Wi-Fi devices, tests the operability and performance of hotspot services and in each new test process, identifies itself to wireless point differently from the device of a previous test process and generates reports, and submits said reports to monitoring server;

at least one monitoring server which receives, records and displays the operability and performance reports of said diagnostic clients, and produces required warnings, and reports the results to a Wi-Fi service provider;

an optional mobile connection which provides an alternative connection if and when the diagnostic client fails to transmit its produced reports to the monitoring server through a wireless access point.

2. A hotspot connection control and measurement device according to claim 1, further comprising:
at least one diagnostic processor ensuring the operability of operating system, applications and scripts in the diagnostic client;
at least one Wi-Fi module enabling the diagnostic client to establish a data connection with the wireless access point;
at least one mobile module enabling the diagnostic client to establish an alternative mobile connection to the monitoring server;
at least one diagnostic memory with retained data storage attribute, which records measurement results of the diagnostic client; and
at least one diagnostic program memory hosting the scripts, applications and operating system of the diagnostic client.

3. A hotspot connection control and measurement device according to claim 1, further comprising:
at least one monitoring processor ensuring the operability of operating system, applications and scripts in the monitoring server;
at least one network connection module establishing the data connection of the monitoring server with diagnostic client;
at least one monitoring display which ensures that the data and reports recorded by the monitoring server are properly displayed and used by service provider;
at least one user interface which ensures control and management of the monitoring server by service provider;
at least one monitoring memory with retained data storage attribute, where the monitoring server records the measurement results received from diagnostic clients; and
at least one monitoring program memory hosting the scripts, applications and operating system of the monitoring server.

4. A hotspot connection control and measurement device according to claim 1, further comprising: at least one diagnostic client which can automatically connect to the hotspot, and does not require a special installation specific to hotspot, and contains a program with a plug-and-play attribute.

5. A hotspot connection control and measurement device according to claim 1, further comprising: at least one diagnostic client which contains certain specific information about the hotspot and/or Wi-Fi service provider network (SSD, Wi-Fi wireless network security method.

6. A hotspot connection control and measurement device according to claim 1, further comprising: at least one diagnostic client which can test the operability and performance of the hotspot services acting in the customer profiles supported by the Wi-Fi service provider.

7. A hotspot connection control and measurement device according to claim 1, further comprising; at least one diagnostic client which can log in by using such authentication methods as captive portal, WDSL and 802.1x determined by Wi-Fi service provider in order to have access to Internet and/or Intranet through the Wi-Fi service provider.

8. A hotspot connection control and measurement device according to claim 1, further comprising:
at least one diagnostic client which has a feature to operate different scripts which in turn enables the diagnostic client to test the services of different Wi-Fi service providers without making any change in main client program.

9. A hotspot connection control and measurement device according to claim 1, wherein:
at least one diagnostic client which is configured to change its physical address information and act as if it is a different Wi-Fi device in each measurement, control and test process.

10. A method for detecting connection problems and service failures and measuring user experience and connection quality in hotspot services, comprising:
establishing, by utilizing at least one diagnostic client, a connection with a hotspot identified in accordance with criteria determined by a service provider;
automatically logging into a system, by utilizing said diagnostic client, by providing the service provider with the diagnostic client's identity information acting like a real user and by using user profiles supported by the service provider;
conducting, by utilizing said diagnostic client, service operability tests in accordance with criteria determined by the service provider;
conducting, by utilizing said diagnostic client, performance tests in accordance with criteria determined by the service provider;
keeping, by utilizing said diagnostic client, records and issuing reports with respect to the tests and controls; and
sending, by utilizing said diagnostic client, the reports to a monitoring server;
determining, by utilizing WiFi service provider, criteria for applying hotspot service operability and performing tests on hotspots;
applying, by utilizing at least one diagnostic client, hotspot service operability and performance tests on the hotspots accessible with an adequate Wi-Fi signal quality, at locations where several hotspots are available, by using the criteria determined by the Wi-Fi service provider, and
starting from the hotspot with the strongest signal strength and going to the weakest hotspot.

11. A hotspot connection control and measurement method according to claim 10, wherein:
at least one diagnostic client continuously tests and reports the hotspot by repeating the test and measurement operations with periodical intervals determined by Wi-Fi service provider.

12. A hotspot connection control and measurement method according to claim 10, further comprising:
after completion of test process, inquiring, by utilizing the diagnostic client, monitoring server which tests are required to be operated in the next test process;
performing, by utilizing the diagnostic client, applicable test steps from the monitoring server; and
operating, by utilizing the diagnostic client, tests that are to-be-applied.

13. A hotspot connection control and measurement method according to claim 10, further comprising:
detecting, by utilizing at least one diagnostic client, all reports after successfully transmitting the test and performance reports to monitoring server.

14. A hotspot connection control and measurement method according to claim 10, further comprising:
following and monitoring, by utilizing at least one diagnostic client, successful/non-successful Wi-Fi connection demands filed to the hotspot by Wi-Fi devices and reporting the results to the monitoring server, in order to measure performance of the hotspot.

15. A method for detecting connection problems and service failures and measuring user experience and connection quality in hotspot services, comprising:
determining, by utilizing a Wi-Fi service provider, criteria for applying hotspot service operability and performing tests on hotspots;
applying, by utilizing at least one diagnostic client, hotspot service operability and performance tests on the hotspots accessible with an adequate Wi-Fi signal quality, at locations where several hotspots are available, by using the criteria determined by the Wi-Fi service provider, and
starting from the hotspot with the strongest signal strength and going to the weakest hotspot.

16. A hotspot connection control and measurement method according to claim 15, wherein where the diagnostic client fails to link to the monitoring server through hotspot, in order to enable the diagnostic client to send its measurement report to monitoring server:
the diagnostic client contains at least one mobile connection ensuring its access to monitoring server.

17. A hotspot connection control and measurement method according to claim 15, further comprising:
performing, by utilizing said at least one diagnostic client, tests measuring the operability and performance of services which do not require authentication in case of failure to receive an authentication verification from the hotspot.

18. A hotspot connection control and measurement method according to claim 15, further comprising:
sending, by utilizing said at least one diagnostic client, the measurement and performance report to monitoring server even in case of failure to receive an authentication verification from the hotspot.

19. A hotspot connection control and measurement method according to claim 15, further comprising:
performing, by utilizing said at least one diagnostic client, tests measuring the operability and performance of the hotspot services by using the information on other user profiles, if any, supported by the Wi-Fi service provider.

20. A hotspot connection control and measurement method according to claim 15, further comprising the following operational steps performed by the diagnostic client:
establishing a wireless network link with the hotspot;
performing an authentication for identification through authentication server;
conducting Internet and/or Intranet connection test; and
logging out via authentication server;
in order to verify the operability of services provided by the hotspot.

21. A hotspot connection control and measurement method according to claim 15, further comprising the following operational steps performed by the diagnostic client:
measuring the signal strength of wireless access points within its coverage area;
testing the speed of taking a DHCP IP address from wireless access point it is linked;
conducting an access speed test to information login web page, if any, depending on the authentication method supported by the service provider;
testing the speed of connection to the authentication server;
testing the speed of authentication of its identity;
testing the DNS analysis speed;
testing the packet loss;
conducting an access speed test to a web page determined by service provider on Internet and/or Intranet;
testing Internet and/or Intranet bandwidth through data uploading/downloading; and
testing the speed of logout through authentication server,
in order to ensure that the diagnostic client measures the hotspot performance.

22. A hotspot connection control and measurement method according to claim 15, further comprising the following operational steps performed by the diagnostic client:
linking to the monitoring server through the hotspot in order to transmit its report;
conducting a data access test on the monitoring server;
if the result of control of access to the monitoring server is positive, sending the records to the monitoring server;
if the result of control of access to monitoring server is negative, trying to establish a data connection to the monitoring server through mobile connection;
if the result of control of access to the monitoring server through the mobile connection is positive, sending the records; and
if the result of control of access to the monitoring server through the mobile connection is negative, storing the records in retained data diagnostic memory;
in order to ensure that the diagnostic client sends its report to monitoring server.

23. The hotspot detection method of claim 15 wherein:
at least one diagnostic client continuously tests and reports the hotspot by repeating the test and measurement operations with periodic intervals determined by the Wi-Fi service provider.

24. A hotspot connection control and measurement method according to claim 23, wherein the mobile connection is one of 2G, 3G, 4G/LTE and 5G other mobile network connection models.

25. The hotspot connection control and measurement method according to claim 15, further comprising:
after completion of test process, inquiring, by utilizing the diagnostic client, monitoring server which tests are required to be operated in the next test process;
performing, by utilizing the diagnostic client, applicable test steps from the monitoring server; and
operating, by utilizing the diagnostic client, tests that are to-be-applied.

* * * * *